United States Patent [19]
Mabuchi et al.

[11] Patent Number: 5,343,102
[45] Date of Patent: Aug. 30, 1994

[54] MINIATURE MOTOR

[75] Inventors: Kazuichi Mabuchi; Yutaka Nishida, both of Matsudo, Japan

[73] Assignee: Mabuchi-Motor Co., Ltd., Matsudo, Japan

[21] Appl. No.: 964,218

[22] Filed: Oct. 21, 1992

[30] Foreign Application Priority Data

Oct. 25, 1991 [JP] Japan .................. 3-279652

[51] Int. Cl.$^5$ ............................................ H02K 11/00
[52] U.S. Cl. ................................. 310/71; 310/40 MM
[58] Field of Search ............ 310/42, 43, 40 MM, 71, 310/242, 249, 84, 239, 245, 246; 349/435, 650

[56] References Cited

U.S. PATENT DOCUMENTS 4,616,149 10/1986 Best ........................ 310/71
4,881,000 11/1989 Wang ...................... 310/71 X

FOREIGN PATENT DOCUMENTS 2221580 2/1990 United Kingdom ............ 310/71

Primary Examiner—R. Skudy
Assistant Examiner—E. To
Attorney, Agent, or Firm—McGlew and Tuttle

[57] ABSTRACT

A miniature motor including a electrically-conductive motor case is provided with a magnet fixedly fitted thereto. A non-electrically conductive case cover is provided holding a brushgear piece as a brush terminal piece. A ground terminal is provided in the form of an electrically conductive contacting piece in contact with case contacting piece. The electrically conductive contacting piece is formed into an essentially U shape. A case cover is provided with a groove for causing the tip of the case contacting piece to be plastically deformed providing electrical contact such that one of the brushes is electrically connected to the motor case via the ground terminal.

6 Claims, 3 Drawing Sheets

MINIATURE MOTOR

BACKGROUND OF THE INVENTION

1. Field of the Invention

This invention relates to a miniature motor, and more particularly to a miniature motor having such a construction that any one of the brushes of the brushgear is adapted to be electrically connected to the motor case.

2. Description of the Pertinent Prior Art

A miniature motor to which this invention is applied has such a construction that a permanent magnet formed into an arc-segment shape is fixedly fitted in a case made of a metallic material, such as mild steel and formed into a bottomed hollow cylindrical shape; a rotor consisting of an armature and a commutator is rotatably fitted to the case; the open end of the case is engaged with a case cover made of an insulating material; and brushes made of an electrically conductive material are provided on the case cover; power being fed to the armature from brush terminals connected to a power source via the brushes and the commutator.

In d-c miniature motors having the aforementioned construction, for example, miniature motors used for automotive electrical components, it is often required that any one of the brush terminals be grounded after having been connected to an electrically conductive motor case.

The conventional method of grounding the miniature-motor body is as follows. A through-hole 8 through which a brush terminal piece 5 is protruded from the inside to the outside is provided on a case cover 7, as shown in FIG. 1 and the brush terminal piece 5 is passed through the through-hole 8 and fixedly fitted by inserting a leg of a split pin 13, made of an electrically conductive material and formed into an essentially U shape, into the through hole 8 from the inside of the case cover 7. After that, when the engaging surface of the case cover 7 is engaged with the motor case 1, another leg of the split pin 13 is forced onto the inside wall of the motor case 1, causing the brush having brush terminal piece 5 and the motor case 1 to be electrically connected.

Another conventional method is as Follows. A leg of the split pin 13 is spot-welded in advance to the motor case 1, and another leg of the split pin 13 is inserted into the through-hole 8 to fixedly fit and electrically connect the brush having the brush terminal piece 5 In FIG. 1, numeral 14 indicates a shouldered part with which the motor case 1 is engaged, and 15 a groove.

However, the construction in the former example, in which a leg of the split pin 13 is held by the motor case 1 and the case cover 7, is unstable in terms of electrical contact. The construction in the latter example, in which a leg of the split pin 13 is spot-welded to the motor case 1 can ensure stable electrical contact, but results in increased cost due to the spot-welding process involved. In addition, the spot welder has to be maintained at all times.

SUMMARY OF THE INVENTION

This invention is intended to overcome the aforementioned problems. It is an object of this invention to provide a miniature motor having such a construction that an end of a ground terminal for connecting a brush and a motor case is disposed between the motor or case and a case cover, and when both the motor case and the case cover are engaged with each other and an end of the motor case is plastically deformed, the ground terminal is also caused to be plastically deformed to ensure that the ground terminal is fixedly fitted to and stably kept contact with the motor case.

DETAILED DESCRIPTION OF THE EMBODIMENTS

Figure 1:
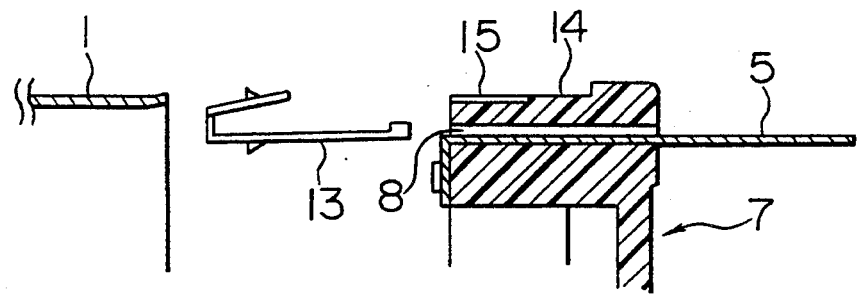
FIG. 1 is a diagram of assistance in explaining the connection between a motor case and a brush terminal in the prior art.
Figure 2:
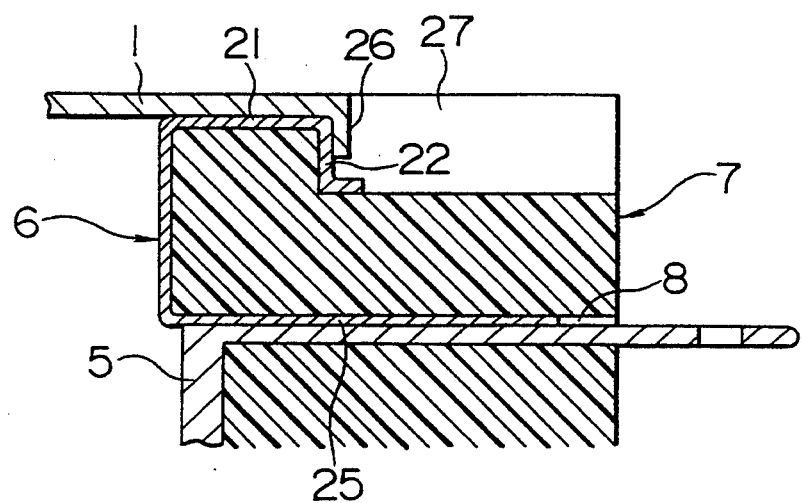
FIG. 2 is a cross-sectional view illustrating the assembled state of a portion of a miniature motor embodying this invention in which a ground terminal is fitted to a motor case and a case cover.
Figure 3:
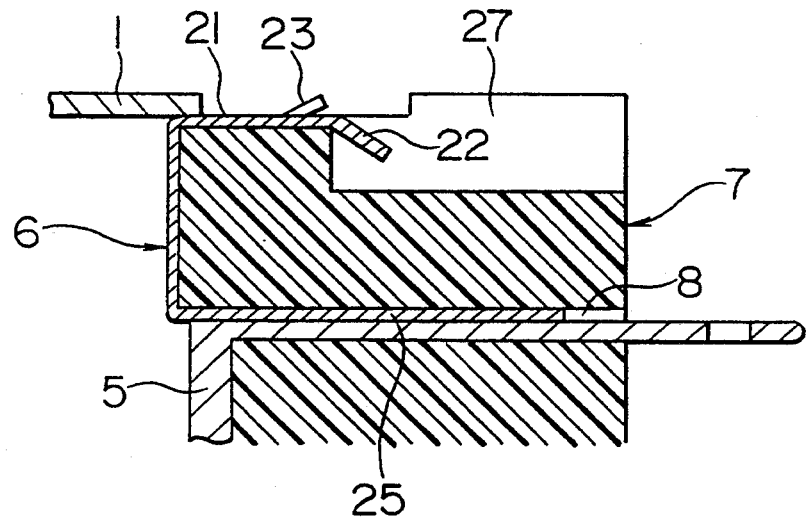
FIG. 3 is a cross-sectional view of the embodiment of this invention before the case cover is engaged with the motor case.
Figure 4:
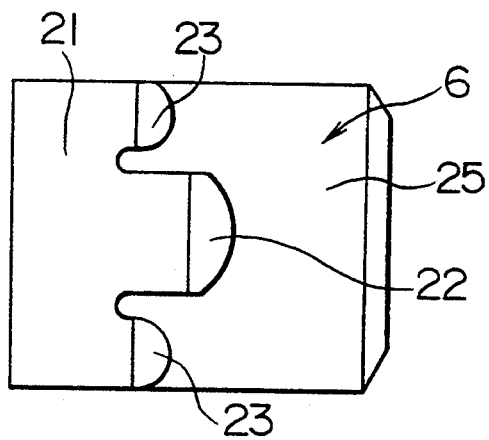
FIG. 4 is a front view illustrating an example of the ground terminal.
Figure 5:
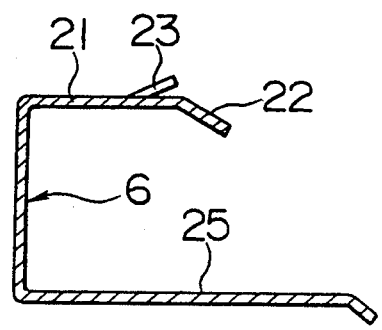
FIG. 5 is a longitudinal sectional view of FIG. 4.
Figure 6:
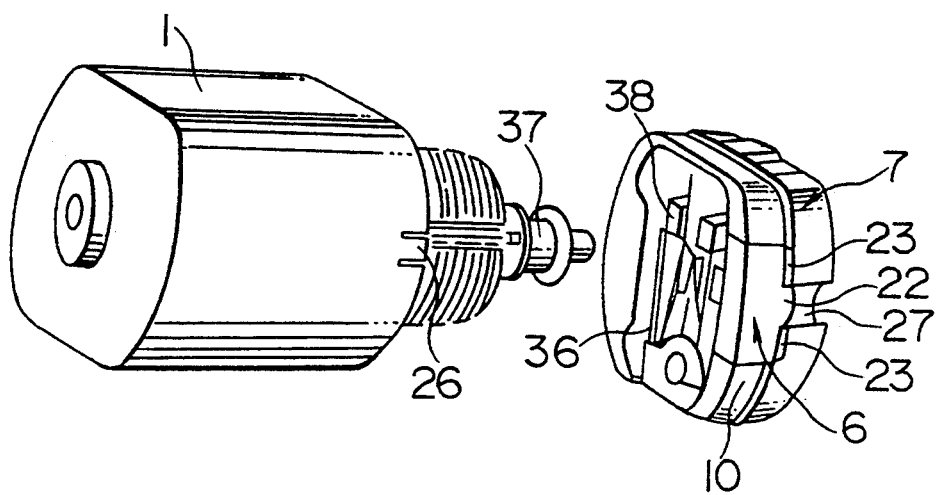
FIG. 6 is an exploded perspective view of a case cover to which a motor case, a rotor and a ground terminal are fitted.
Figure 7:
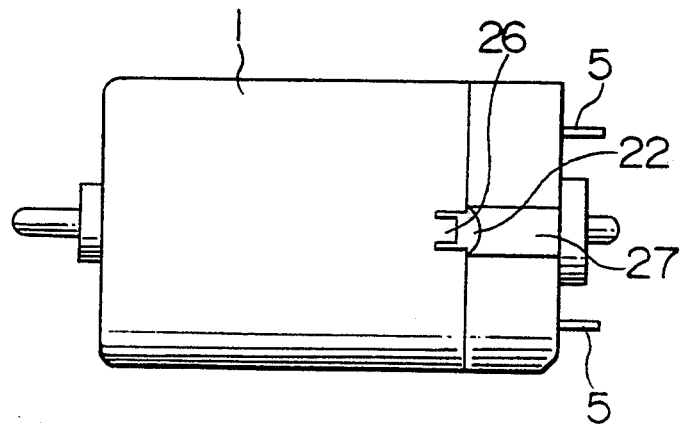
FIG. 7 is an external appearance showing an embodiment of this invention.

FIG. 2 is a cross-sectional view illustrating the assembled state of a portion of a miniature motor of this invention in which a ground terminal is fitted to the motor case and the case cover. FIG. 3 is a cross-sectional view of FIG. 2 before the case cover is engaged with the motor case. FIG. 4 is a front view illustrating an example of the ground terminal. FIG. 5 is a longitudinal sectional view of FIG. 4 FIG. 6 is an exploded perspective view of a case cover in an embodiment of this invention, to which a motor case, a rotor and a ground terminal are fitted. FIG. 7 is a diagram illustrating an external appearance of an embodiment of this invention.

In FIGS. 2 through 7, engaging surfaces 10 are provided on a motor case 1 made of an electrically conductive material and a case cover 7 made of a non-electrically conductive material. A ground terminal 6 of an essentially U shape shown in FIGS. 4 and 5 is installed on the engaging surfaces 10, as shown in Flu 3. The ground terminal 6 has a case contacting piece 21 coming in contact with the motor case 1, and an electrically conductive part contacting piece 25 coming in contact with the brush terminal piece 5. The case contacting piece 21 has a deforming part 22 bent towards the electrically conductive part contacting piece 25 and two case contacting springs 23 bent towards the opposite side of the electrically conductive part contacting piece 25.

A projection 26 is formed on the open end side of the motor case 1, and a groove 27 is formed on the case cover 7.

The ground terminal 6 is installed on the case cover 7, as shown in FIG. 3. The brush terminal piece 5 is disposed in a through-hole 8 provided on the case cover 7, for example, the electrically conductive part contacting piece 25 of the ground terminal 6 is inserted into the through-hole 8 and fixedly fitted thereto while keeping contact with the brush terminal piece 5. The brushgear 36 is fixedly fitted inside the case cover 7.

By engaging the motor case 1 with the engaging surface 10 of the case cover 7, the inside surface of the open end of the motor case 1 is forced onto the case contacting springs 23 and engaged with the case cover 7. Next, the projection 26 provided on the motor case 1 is caused to be plastically deformed, together with the tip of the case contacting piece 21, that is, the deforming part 22, and fixedly fitted into the groove 27 provided on the case cover 7, as shown in FIG. 2.

The ground terminal 6 is fixedly fitted to the case cover 7, anti a sufficient contact pressure between the ground terminal 6 and the motor case 1 can be obtained, thereby ensuring stable electrical contact.

Figure 8:
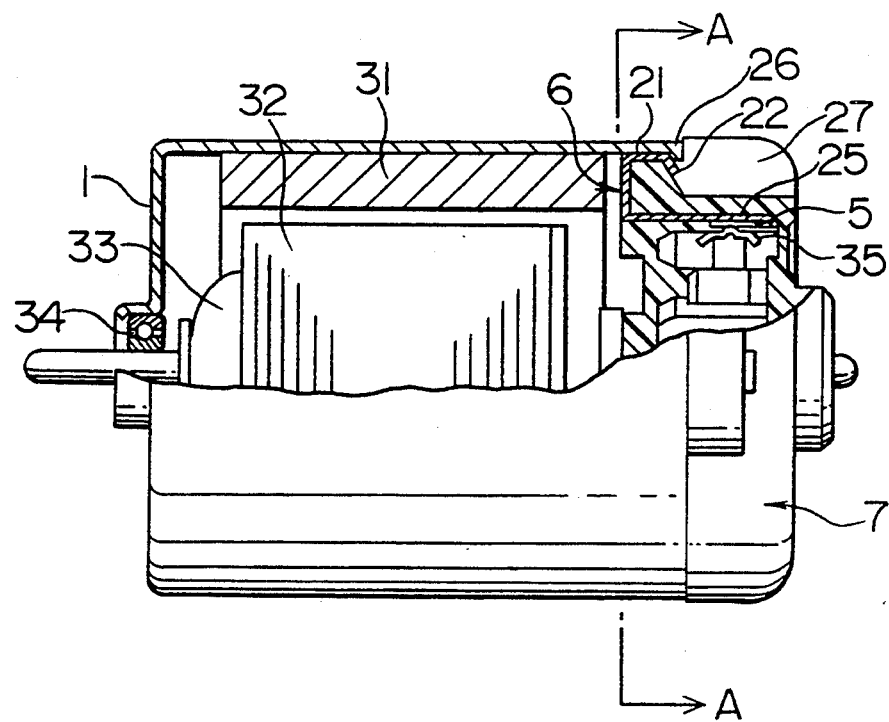
FIG. 8 is a cross-sectional view of a miniature motor, which is another embodiment of this invention.
Figure 9:
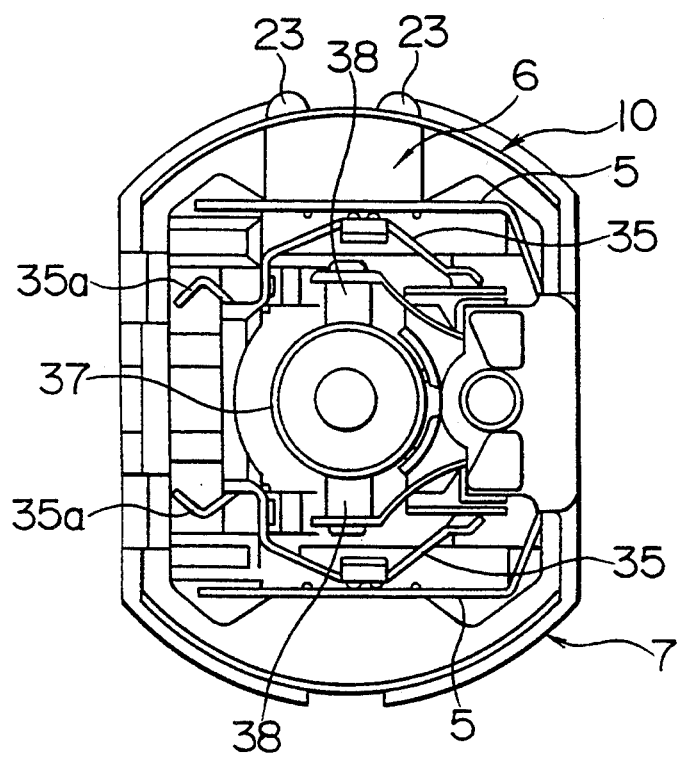
FIG. 9 is a cross-sectional view taken along the line A—A in FIG. 8, with the motor case removed.

FIG. 8 is a cross-sectional view of a miniature motor representing another embodiment of this invention. FIG. 9 is a cross-sectional view taken along the line A—A in FIG. 8, with the motor case removed.

In FIGS. 8 and 9, like parts are indicated by like numerals in FIGS. 2 through 7.

Inside the motor case 1 fixedly fitted is a permanent magnet 31, and a rotor formed by winding an armature wire 33 around an iron core 32 is rotatably supported by bearings 34 inside the permanent magnet 31. The open end of the motor case 1 is engaged with the case cover 7 made of a resin material, and a part to which an essentially U-shaped ground terminal 6 is fitted is formed, and a groove 27 for causing both the deforming part 22 of the ground terminal 6 and part of the open end of the motor case 1 to be simultaneously plastically deformed is also provided on the engaging surface 10 of the case cover 7, as shown in FIGS. 4 and 5.

The electrically conductive part contacting piece 25 of the ground terminal 6 is disposed between the case cover 7 and the brush terminal piece 5, and the brush terminal piece 5 is pushed by the resiliency of the connecting terminal 35 to cause the electrically conductive part contacting piece 25 and the brush terminal piece 5 to make contact with each other and to be held in position. A terminal piece of the connecting terminals 35 is a terminal 35a for feeding power to the commutator 37 via the brushes 38.

The case contacting piece 21 of the ground terminal 6 has a deforming part 22 and two case contacting springs 23, as shown in FIGS. 4 and 5. As the open end of the motor case 1 is engaged with the case cover 7, the case contacting springs 23 are pressed and the deforming part 22 is caused to be deformed, together with part of the open end of the motor case 1, by the groove 27 provided on the case cover 7. Thus, a stable contact pressure between the ground terminal 6 and the motor case 1 can be obtained.

In the foregoing description, description is made about the case where part of the open end of the motor case 1 and the deforming part 22 of the ground terminal 6 are simultaneously plastically deformed. However, only the deforming part 22 of the ground terminal 6 may be plastically deformed alone toward the case cover 7, while the motor case 1 may be engaged with the case cover 7 by other means.

As described above, this invention makes it possible to ensure stable electrical contact since a sufficient contact pressure can be obtained between the motor case and the ground terminal by disposing case contacting pieces of the ground terminal on the engaging surfaces of the motor case and the case cover to engage the motor case with the case cover, and causing the deforming part of the ground terminal to be plastically deform toward the case cover.

Causing the deforming part of the ground terminal and part of the open end of the motor case to simultaneously plastically deform reduces assembly manhours and manufacturing cost.

Eliminating spot welding requires no equipment for the purpose, nor maintenance For the equipment, making cost reduction possible.

What is claimed is:

1. A miniature motor, comprising:
   an electrically conductive motor case having a hollow cylindrical shape with an open end and an inner surface;
   a magnet fixedly fitted to said inner surface;
   a non-electrically conductive case cover having an outer circumferential surface and an outer end surface and holding a brushgear including a brush terminal piece, said brush terminal piece protruding through said outer end surface on opposite said non-electrically conductive case cover, said case cover having a groove formed in said outer circumferential surface extending to said outer end surface, a portion of said inner surface of said conductive motor case being engaged with said outer circumferential surface of said non-electrically conductive case cover with a portion of said electrically conductive motor case, at said open end, being plastically deformed, extending into said groove according to a shape of said groove;
   ground terminal means for providing electrical connection between said motor case and said brush terminal piece, said ground terminal means being formed into a U shape to provide a case contacting piece and an electrically conductive part contacting piece, said case contacting piece being pressed between said outer surface of said case cover and said inner surface of said motor case by engaging said case cover into said motor case, said case contacting piece having a tip, said tip being plastically deformed extending into said groove according to said shape of said groove, said electrically conductive part contacting piece being brought into contact with and being fixedly fitted to said brush terminal piece of said brushgear, thereby providing electrical connection between a brush of said brushgear and said motor case.

2. A miniature motor as set forth in claim 1 wherein a length of said electrically conductive part contacting piece in an axial direction of said motor case is formed larger than a length of said case contacting piece in the axial direction of said motor case.

3. A miniature motor as set forth in claim 1 wherein said case contacting piece is formed into a projected contour on a plane of an essentially E shape, and a deforming part is provided in the middle of said case contacting piece and case contacting springs are provided on both sides of said deforming part.

4. A miniature motor as set forth in claim 3 wherein tips of said case contacting springs are bent towards a motor case side, and tips of said deforming part and said electrically conductive part contacting piece are bent towards a brush terminal side.

5. A miniature motor as set forth in claim 3 wherein a length of said deforming part in an axial direction of said motor case is formed larger than a length of said case contacting springs in the axial direction of said motor case.

6. A miniature motor, comprising:

an electrically conductive motor case having a hollow cylindrical shape with an open end and an inner surface;

a magnet fixedly fitted to said inner surface;

a non-electrically conductive case cover having an outer circumferential surface and an outer end surface and having a through hole and holding a brushgear including a brush terminal piece, said brush terminal piece protruding through said through hole to said outer end surface on an opposite side of said case cover, said case cover having a groove formed in said outer circumferential surface extending to said outer end surface, a portion of said inner surface of said conductive motor case being engaged with said outer circumferential surface of said non-electrically conductive case cover with a portion of said electrically conductive motor case, at said open end, being plastically deformed, extending into said groove according to a shape of said groove, said groove having a step at one end and extending to an open end bracket;

ground terminal means for providing electrical connection between said motor case and said brush terminal piece, said ground terminal means being formed into a U shape to provide a case contacting piece and an electrically conductive part contacting piece, said case contacting piece being pressed between said outer surface of said case cover and said inner surface of said motor case by bracket upon and bracket engaging said case cover into said motor case, said case contacting piece having a tip, said tip being plastically deformed along with a projection of said motor case according to said step at one end of said groove such that said tip and said motor case projection extend into said groove whereby said case contacting piece is pressed between said motor case and said case cover, said electrically conductive part contacting piece being brought into contact with and being fixedly fitted to said brush terminal piece of said brushgear, thereby providing electrical connection between a brush of said brushgear and said motor case.

* * * * *